United States Patent [19]
Chiu

[11] Patent Number: 5,829,770
[45] Date of Patent: Nov. 3, 1998

[54] BICYCLE TRAILER HAVING A SUNSHADE SUPPORT FOLDABLE IN ONE STROKE OPERATION

[76] Inventor: Ping-Jan Chiu, No. 1146, Chung-Shan Rd., Ta-Chia Chen, Taichung Hsien, Taiwan

[21] Appl. No.: 705,223

[22] Filed: Aug. 29, 1996

[51] Int. Cl.⁶ .................................................. B62K 27/12
[52] U.S. Cl. ........................ 280/204; 280/642; 280/656
[58] Field of Search .................................. 280/204, 292, 280/642, 644, 650, 656, 657, 647

[56] References Cited

U.S. PATENT DOCUMENTS

| | | | |
|---|---|---|---|
| 5,110,150 | 5/1992 | Chen | 280/642 |
| 5,577,746 | 11/1996 | Britton | 280/204 |
| 5,605,409 | 2/1997 | Haut | 280/642 |
| 5,645,293 | 7/1997 | Cheng | 280/642 |
| 5,669,618 | 9/1997 | Chiu | 280/204 |

*Primary Examiner*—Anne Marie Boehler
*Attorney, Agent, or Firm*—McDermott, Will & Emery

[57] ABSTRACT

A bicycle trailer includes a frame with front and rear pivot seats, and a sunshade support provided with a foldable unit consisting of a vertical lower rod, a vertical upper rod and a curved rod. The lower rod has a bottom end connected pivotally to the rear seat and an upper end connected pivotally to the upper rod. The curved rod has a front end connected pivotally to the front seat and a rear end connected pivotally to a top end of the upper rod. A bracing element is mounted movably on the lower rod and capable of bracing the upper and lower rods together such that the upper and lower rods are immobilized to each other in a parallel manner. When depressed and pushed frontwardly of the frame, the bracing element permits folding action of the lower rod onto the frame, the upper rod onto the lower rod, and the curved rod onto the upper rod.

2 Claims, 11 Drawing Sheets

BICYCLE TRAILER HAVING A SUNSHADE SUPPORT FOLDABLE IN ONE STROKE OPERATION

BACKGROUND OF THE INVENTION

1. Field of the Invention

The invention relates to a bicycle trailer, more particularly to a bicycle trailer with an uprightly erected sunshade support that can be folded in a one-stroke operation.

2. Description of the Related Art

Referring to FIGS. 1, 2 and 3, a conventional bicycle trailer 10 is shown to include a rectangular frame 11, two wheels 15 provided detachably on two side portions of the frame 11, a sunshade support consisting of two pairs of quick-release locking units 13 and a pair of curved rods 12, and a connecting device 14 which is adapted to be coupled to the frame body of a bicycle so that the trailer 10 can be towed by the bicycle.

As illustrated, the frame 11 has two pairs of vertical stubs 113 which extend upwardly therefrom in such a manner that the stubs 113 in one pair are respectively located on two sides of the front end portion 11a while the stubs 113 in the other pair are respectively located on two sides of the rear end portion 11b. A pivot seat 115 is secured to a lower surface of the front end portion 11a of the frame 11.

Each of the quick-release locking units 13 includes a lower half 13a which has a lower tubular section 131 sleeved securely on the corresponding stub 113 and an upper annular ring 136 with internal teeth 133, and an upper half 13a which has a lower annular ring 137 provided with internal teeth 134 that mesh with the teeth 133 of the lower half 13a, a compression spring 13c interposed between the rings 136, 137 of the halves 13a, and a locking bolt 135 which extends through the rings 136, 137 to engage a nut 138 so as to lock the upper half 13a on the lower half 13a. The end portions of the curved rods 12 are inserted into the upper tubular sections 132 of the upper halves 13a of the locking units 13. A horizontal reinforcing rod 121 is detachably connected to the curved rods 12 by means of screws 122 before the sunshade shield 10A (see FIG. 1) is stretched over the curved rods 12.

The connecting device 14 includes a generally L-shaped connecting rod 140, a coupler unit 141 attached on a front section 140a of the connecting rod 140, and a pivot pin 17 which extends through a rear section 140b of the connecting rod 140 and the pivot hole 16 of the seat 115 in such a manner that the connecting rod 140 can be rotated about the pin 17 between a storage position and a used position. A lock pin 114 extends through the holes 16a of the seat 115 and the hole 140c of the connecting rod 140 so as to prevent rotation of the connecting rod 140 on the seat 115. The pin 114 includes a pin body and a U-shaped metal wire 114b which has an outer end fastened to an enlarged outer end 114a of the pin body, and an inner end sleeved slidably on the inner end portion of the pin body outside the seat 115. The inner end of the metal wire 114b can be forcibly removed from the pin 114 so as to permit folding of the connecting rod 140 into the storage position.

The free end portion of the connecting rod 140 is equipped with a mounting plate 141c, a reinforcing strap 143 fastened to the connecting rod 140, and a compression spring 142 which interconnects the mounting plate 141c and the connecting rod 140. The coupler unit 141 includes an elongated vertical inner plate 141b which is adapted to be disposed on one side of the bicycle frame to abut against the seat and chain stays of the bicycle frame (not shown), and an elongated outer plate 141a which is adapted to be disposed on the other side of the bicycle frame to abut against the seat and chain stays of the frame (not shown) in such a manner that inclined upper and lower fastening tabs 1411, 1412 on the outer plate 141a extend toward the inner plate 141b. A positioning stub 1413 projects rearward from the lower portion of the outer plate 141a to abut against a kickstand-mounting piece (not shown) that is secured to the chain stay near the rear wheel axle. A locking bolt 141d is inserted through the hole of the inner plate 141b and through the mounting holes of the outer plate 141a and the mounting plate 141c so as to fasten the nut 141e. Thus, the plates 141a, 141b are locked on the seat and chain stays of the bicycle frame to prevent disengagement of the coupler 141 from the bicycle frame.

As illustrated in FIG. 4, the curved rods 12 can be folded onto the frame 11 after the upper halves of the locking units (not visible) are unlocked from the lower halves. The wheels 15 can be detached so as to be stored underneath the frame 11. The connecting rod 140 can be folded relative to the seat 115 so as to dispose the same at the storage position.

Referring to FIGS. 1 to 3, a drawback of the conventional bicycle trailer 10 resides in that the upper halves 13a of the locking units 13 must be released from the lower halves 13a prior to folding the curved rods 12 onto the frame 11. The unlocking operation of the upper halves relative to the lower halves annoys the user.

SUMMARY OF THE INVENTION

The object of this invention is, therefore, to provide a bicycle trailer with an uprightly erected sunshade support that can be folded in a one-stroke operation so as to facilitate transport and storage thereof.

Accordingly, the bicycle trailer of this invention is adapted to be towed by a bicycle and includes a rectangular carrier frame, two wheels provided on two side portions of the frame, a connecting device which is adapted to be coupled with a frame body of the bicycle, a sunshade support, a pivot joint device, and a bracing device. The carrier frame has a front end portion, a rear end portion, and two pairs of pivot seats. The pivot seats of one pair are respectively located on two sides of an upper surface of the front end portion of the frame while the pivot seats of the other pair are respectively located on two sides of an upper surface of the rear end portion thereof. The sunshade support includes a pair of rod units, each of which consists of two vertical lower rods, two vertical upper rods, and a pair of curved rods. The curved rods have front ends connected pivotally to the pivot seats on the front end portion of the frame while the lower rods have bottom ends connected pivotally to the pivot seats on the rear end portion of the frame. The joint device includes a pair of lower pivot joints, and a pair of upper pivot joints. Each of the upper pivot joints is pivoted to an upper end of a respective one of the upper rods and a rear end of a respective one of the curved rods at different positions. Each of the lower pivot joints is pivoted to the upper rod and a top end of the lower rod at different positions. The bracing device includes a pair of spring-biased bracing elements, and a horizontal rod connected securely to the bracing elements so as to move together therewith relative to the lower rods. Each of the bracing elements has an upwardly opening accommodation hole which receives fittingly the lower end of the upper rod, thereby immobilizing the upper rods relative to the lower rods and permitting the upper rod to be parallel to the lower rod. Under this condition, the sunshade support is retained stationarily on the frame such that a sunshade shield can be mounted on the sunshade support.

The horizontal rod can be depressed so as to move the bracing elements toward the frame, thereby disengaging the lower ends of the upper rods from the accommodation holes of the bracing elements to permit simultaneous folding action of the lower rods onto the frame, the upper rods onto the lower rods, and the curved rods onto the upper rods upon pushing the horizontal rod forwardly toward the front end portion of the frame immediately after depression of the horizontal rod.

BRIEF DESCRIPTION OF THE DRAWINGS

Other features and advantages of this invention will become apparent in the following detailed description of the preferred embodiment of this invention, with reference to the accompanying drawings, in which.

DETAILED DESCRIPTION OF THE PREFERRED EMBODIMENT

Figure 1:
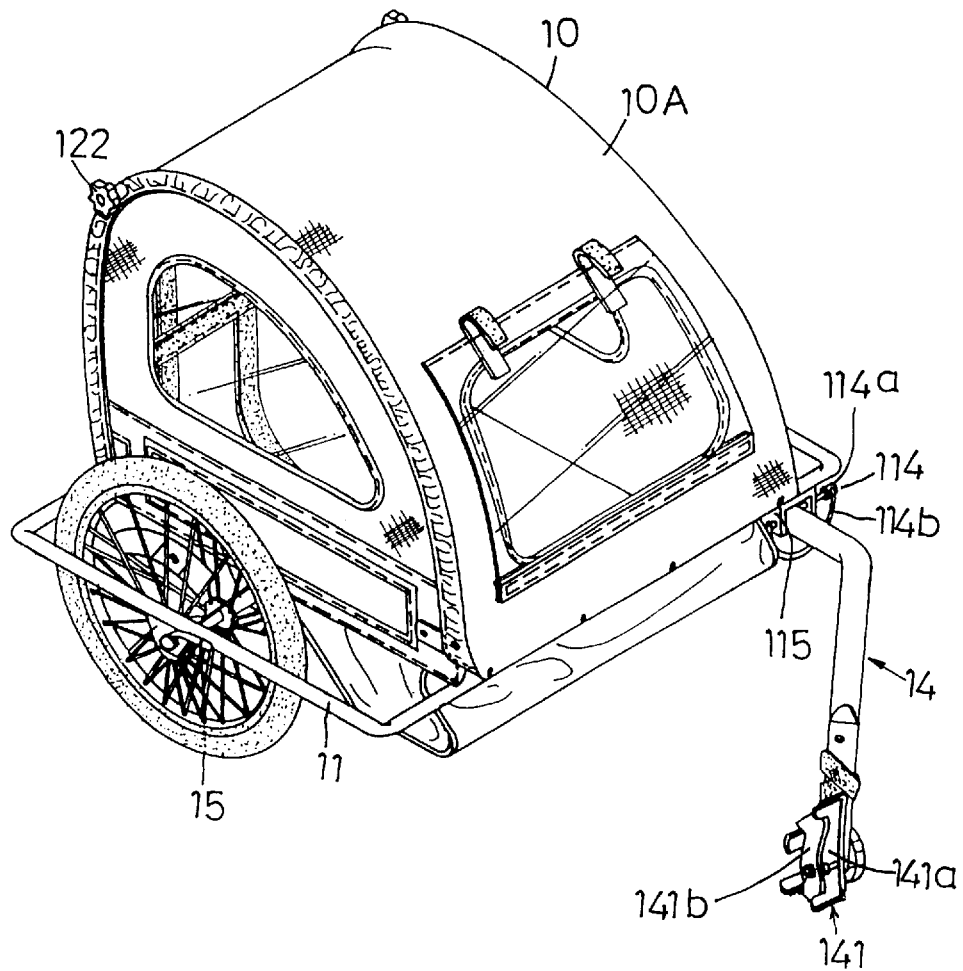
FIG. 1 is a perspective view of a conventional bicycle trailer.
Figure 2:
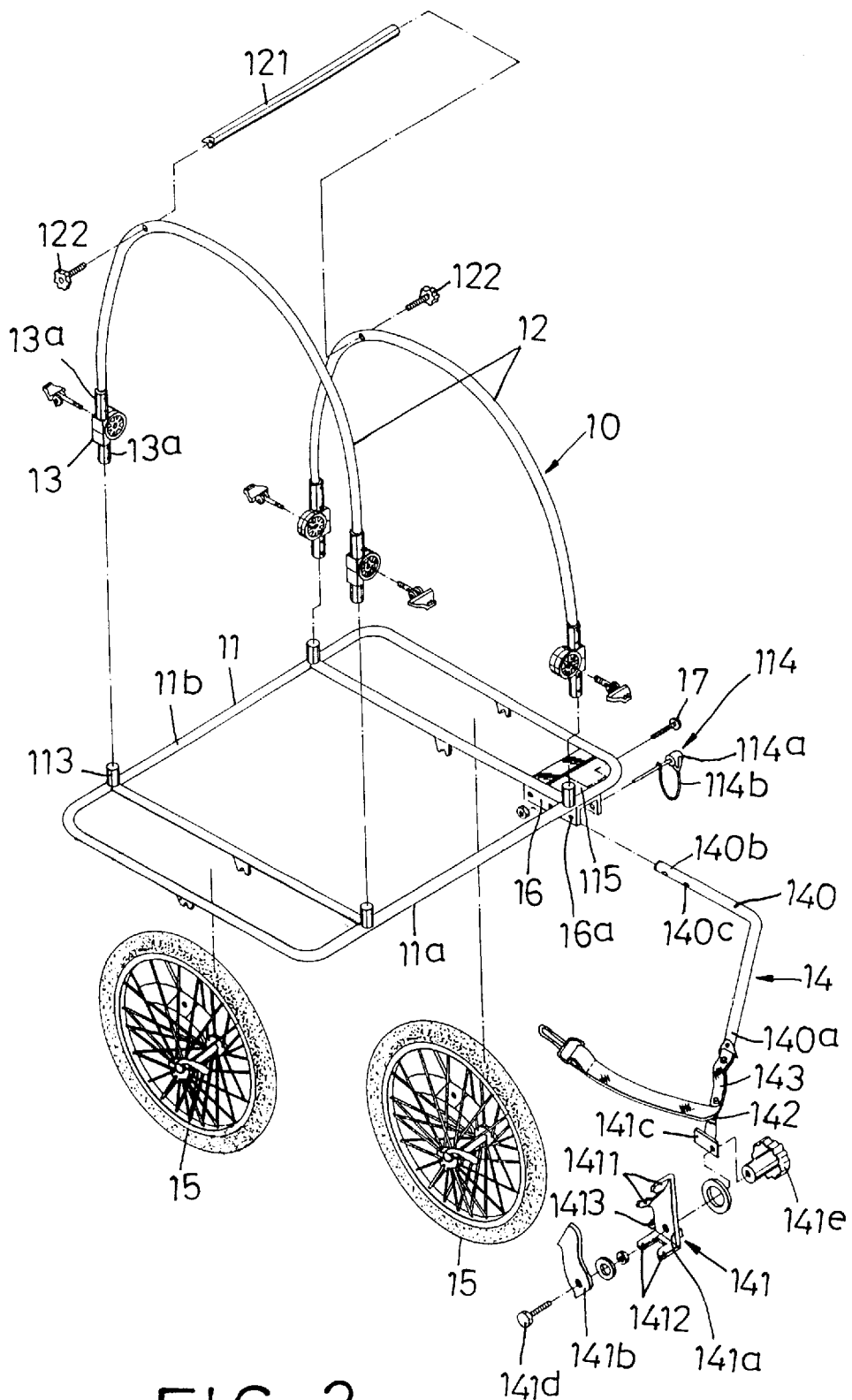
FIG. 2 is an exploded view of the conventional bicycle trailer.
Figure 3:
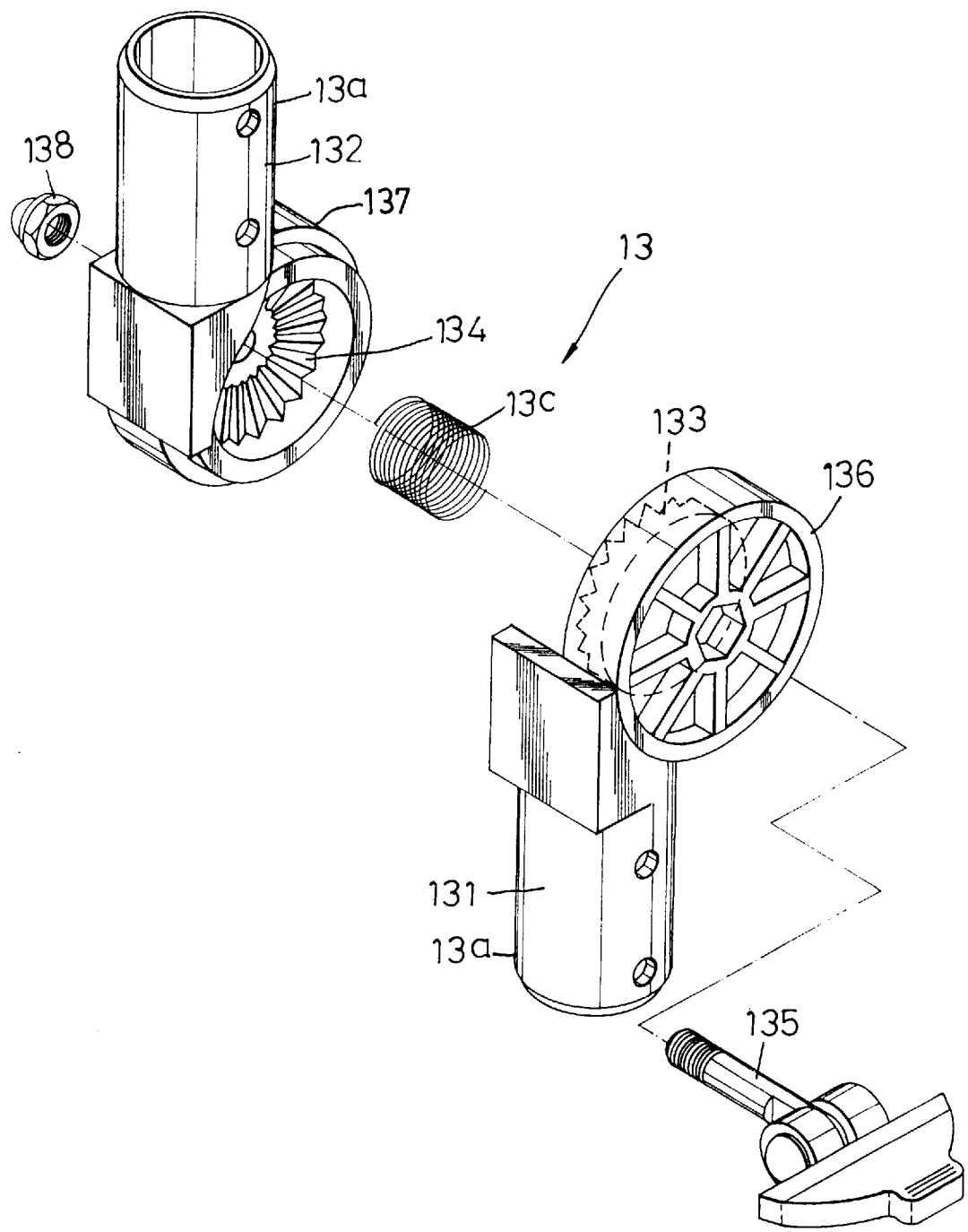
FIG. 3 is an exploded view of a quick-release locking unit employed in the conventional bicycle trailer.
Figure 4:
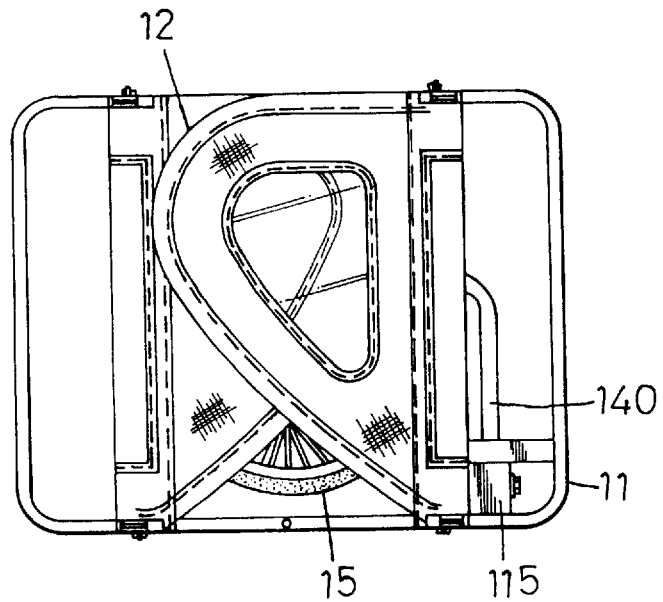
FIG. 4 illustrates how a sunshade support is folded in the conventional bicycle trailer after removal of the wheels therefrom.
Figure 5:
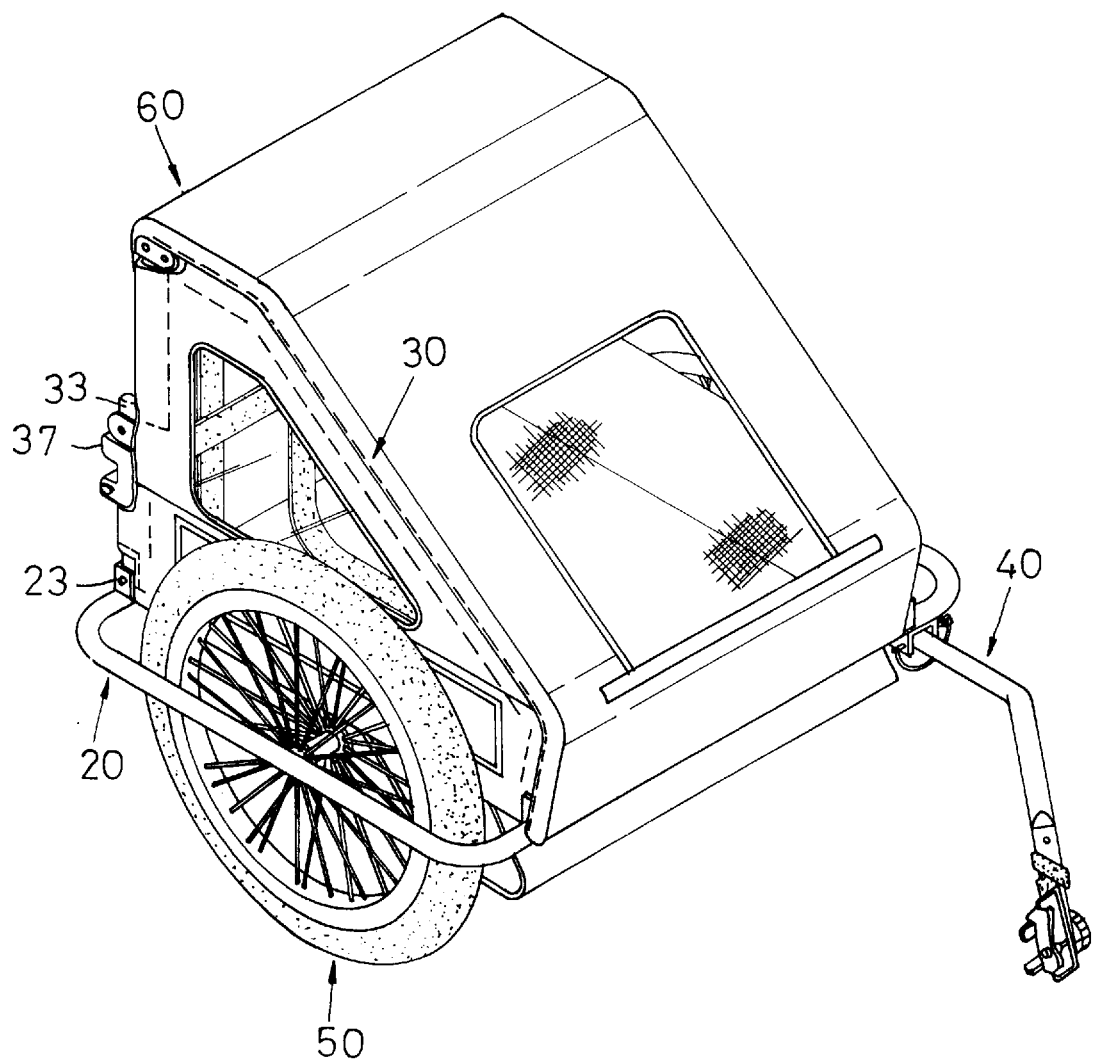
FIG. 5 is a perspective view of a bicycle trailer of this invention.
Figure 6:
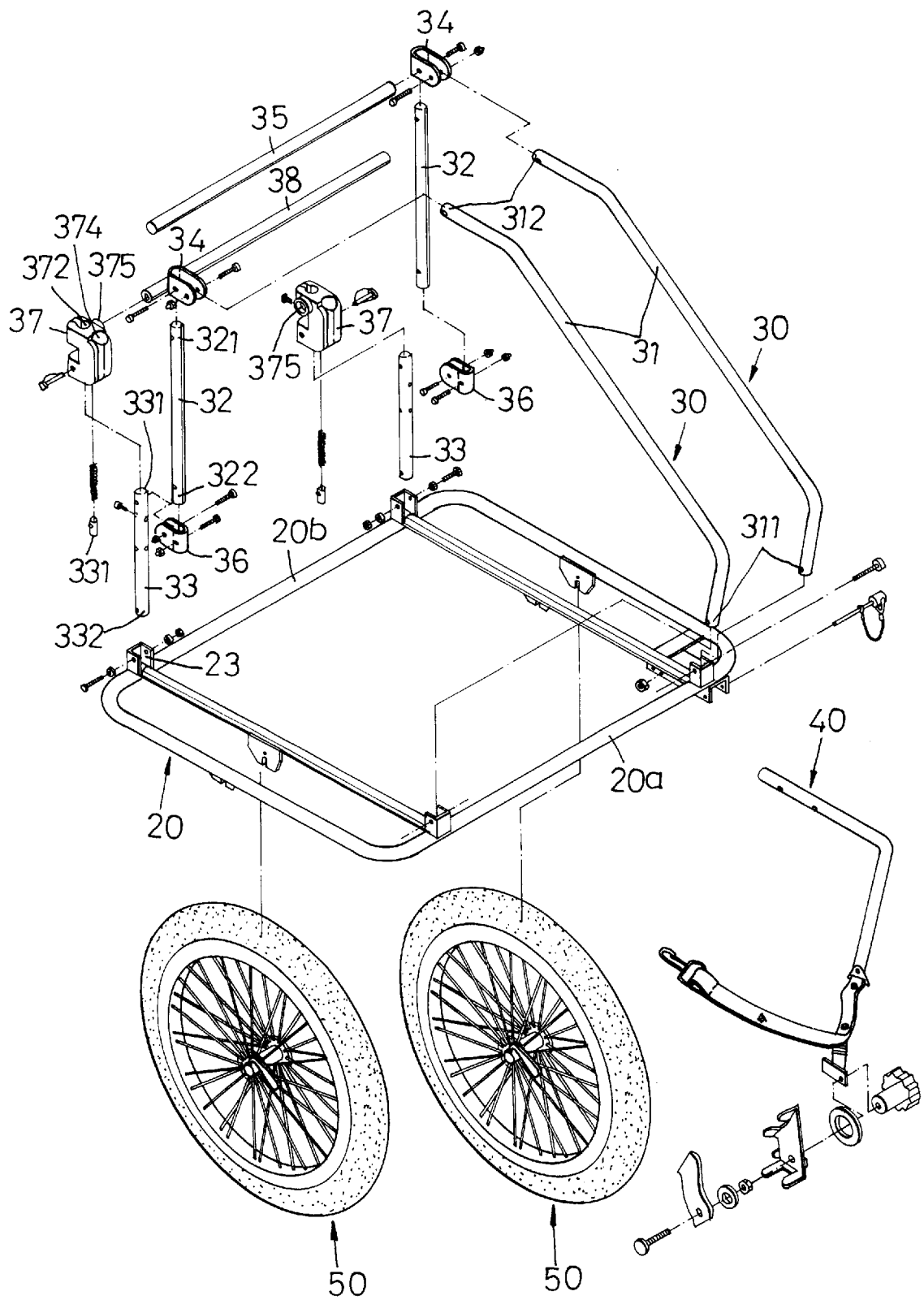
FIG. 6 is an exploded view of a bicycle trailer of this invention.
Figure 7:
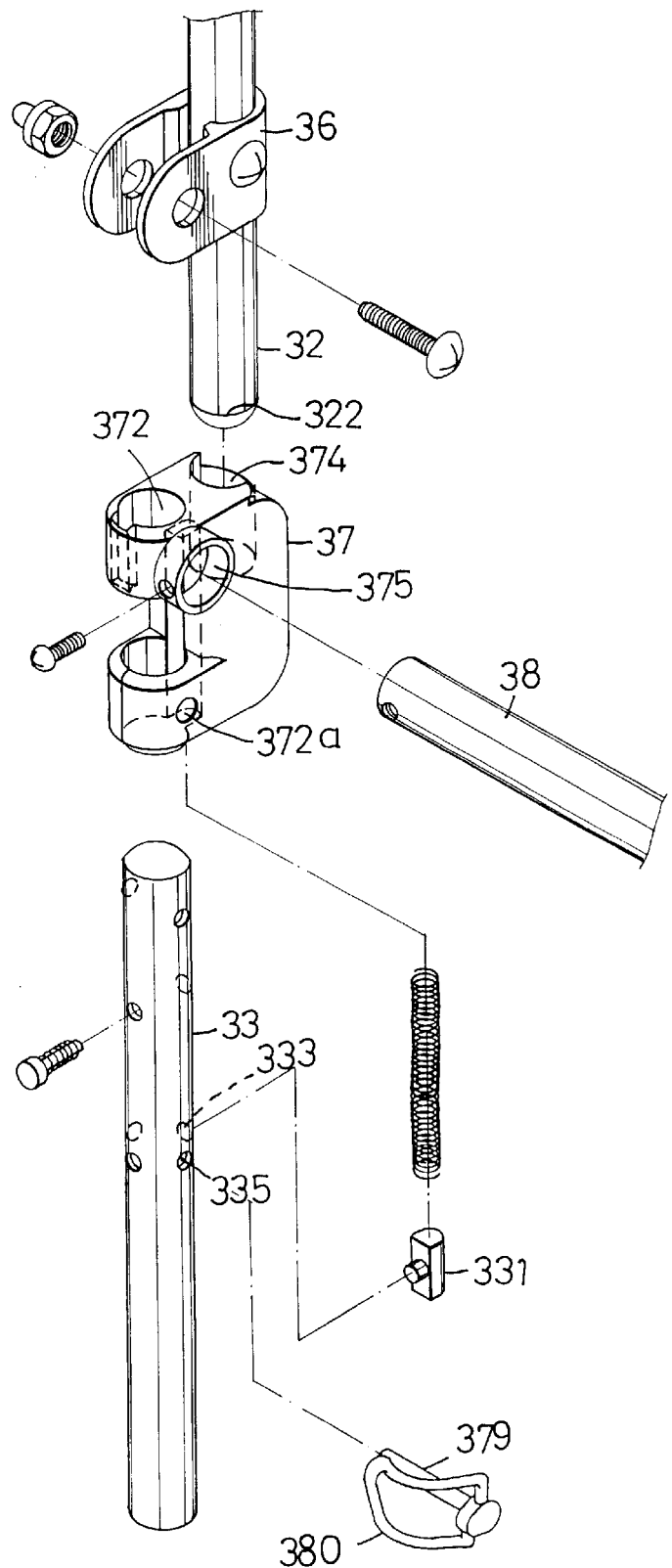
FIG. 7 illustrates how upper and lower rods are braced into position according to this invention.
Figure 8:
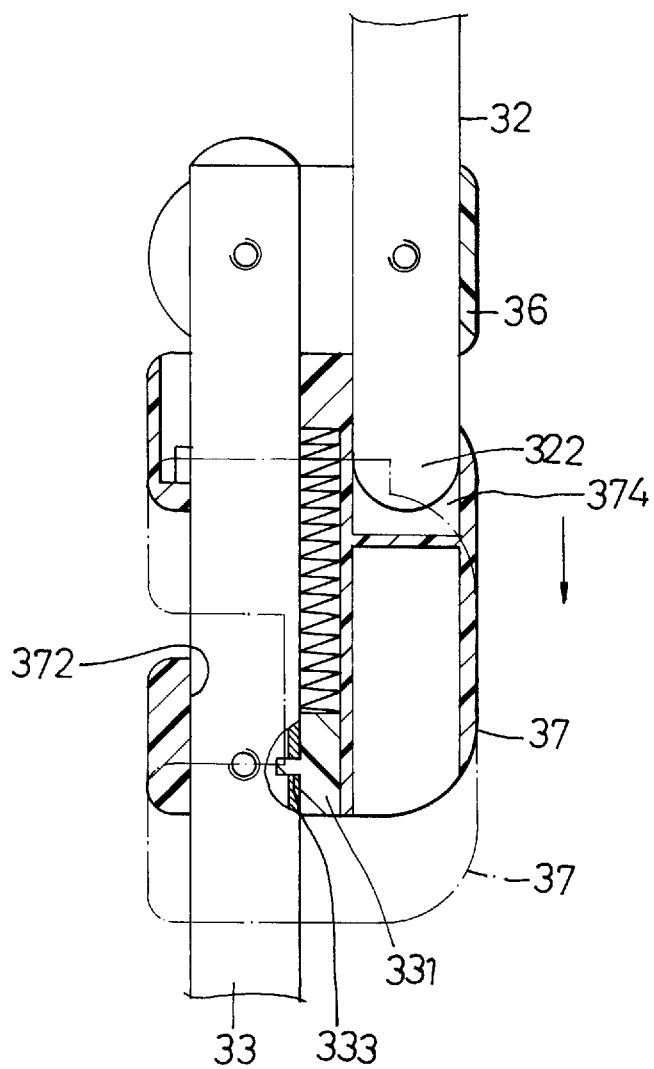
FIG. 8 is a partly sectional view illustrating how the upper and lower rods are braced into position according to this invention.

Referring to FIGS. 5, 6, 7 and 8, the bicycle trailer of this invention is shown to include a rectangular carrier frame 20, two wheels 50 provided on two side portions of the frame 20, a connecting device 40 which is adapted to be coupled with the frame body of a bicycle, a sunshade support 30, a pivot joint device, and a bracing device.

The connecting device 40 has the same structure as that disclosed in the prior art so that a detailed description of the structure thereof will be omitted herein.

As illustrated, the frame 20 has a front end portion 20a, a rear end portion 20b, and two pairs of pivot seats 23. The pivot seats 23 of one pair are respectively located on two sides of an upper surface of the front end portion 20a of the frame 20 while the pivot seats 23 of the other pair are respectively located on two sides of an upper surface of the rear end portion 20b. The sunshade support 30 includes a pair of foldable units, each of which consists of a lower rod 33, a vertical upper rod 32, and a curved rod 31. The curved rods 31 have front ends 311 connected pivotally to the pivot seats 23 on the front end portion 20a while the lower rods 33 have bottom ends 332 connected pivotally to the pivot seats 23 on the rear end portion 20b.

The pivot joint device includes a pair of lower pivot joints 36, and a pair of upper pivot joints 34. Each of the upper pivot joints 34 is pivoted to an upper end 321 of a respective one of the upper rods 32 and a rear end 312 of a respective one of the curved rods 31 at different positions. Each of the lower pivot joints 36 is pivoted to the upper rod 32 and a top end 331 of the lower rod 33 at different positions.

The bracing device includes a pair of spring-biased bracing elements 37, and a horizontal rod 38 which has two ends extending into two lateral holes 375 of the bracing elements 37 so as to move together therewith relative to the lower rods 33. Each of the bracing elements 37 has an upwardly opening accommodation hole 374 which receives fittingly the lower end 322 of the upper rod 32, thereby immobilizing the upper rods 32 relative to the lower rods 33 and correspondingly permitting the upper rods 32 to be parallel to the lower rods 33. Under this condition, the sunshade support 30 is retained stationarily on the frame 20 such that a sunshade shield 60 (see FIG. 5) can be erected on the sunshade support 30. A reinforcing rod 35 is disposed between the upper pivot joints 34 so as to further strengthen the sunshade support 30.

Each of the bracing elements 37 has a generally upright hole 372 formed therethrough to permit extension of the lower rod 33, and a spring-loaded tongue 331 which projects horizontally into and which engages an engagement hole 333 formed in the lower rod 33 so that the bracing elements 37 can move relative to the lower rods 33 so as to disengage the lower ends 322 of the upper rods 32 from the accommodation holes 374 of the bracing elements 37.

Figure 9:
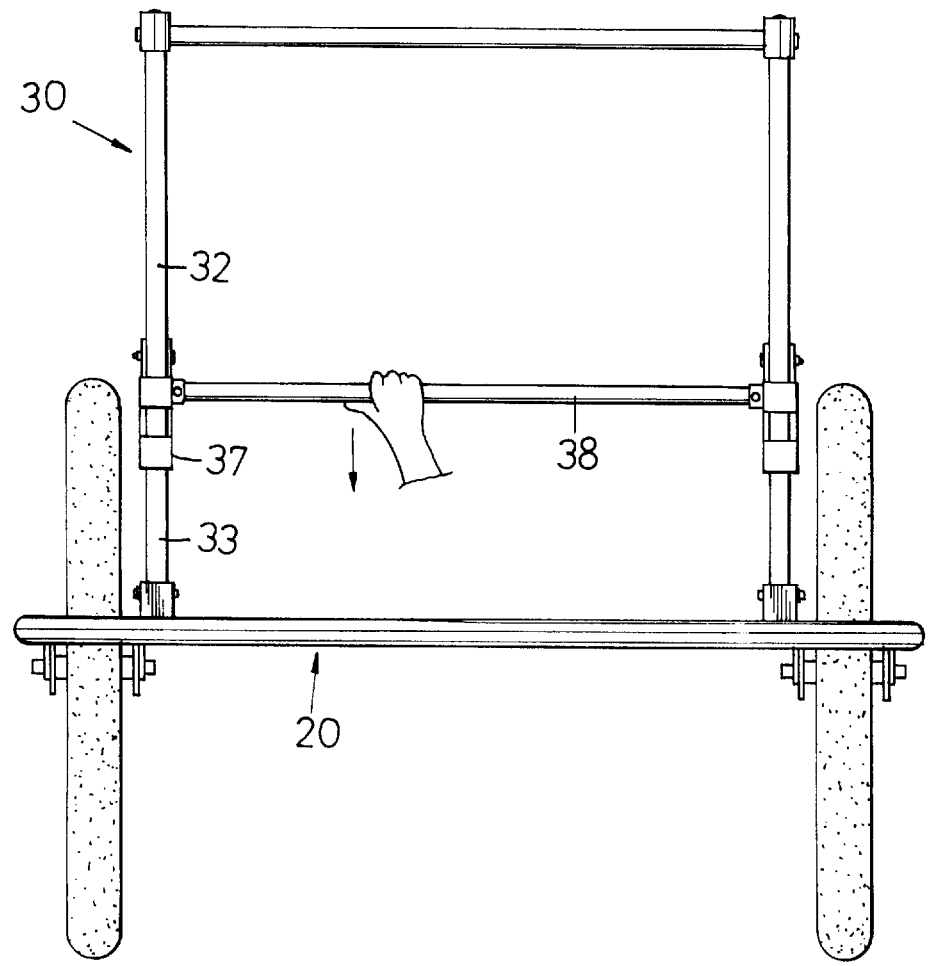
FIG. 9 shows how bracing elements are depressed in order to disengage the upper rod from the lower rod according to this invention.
Figure 10:
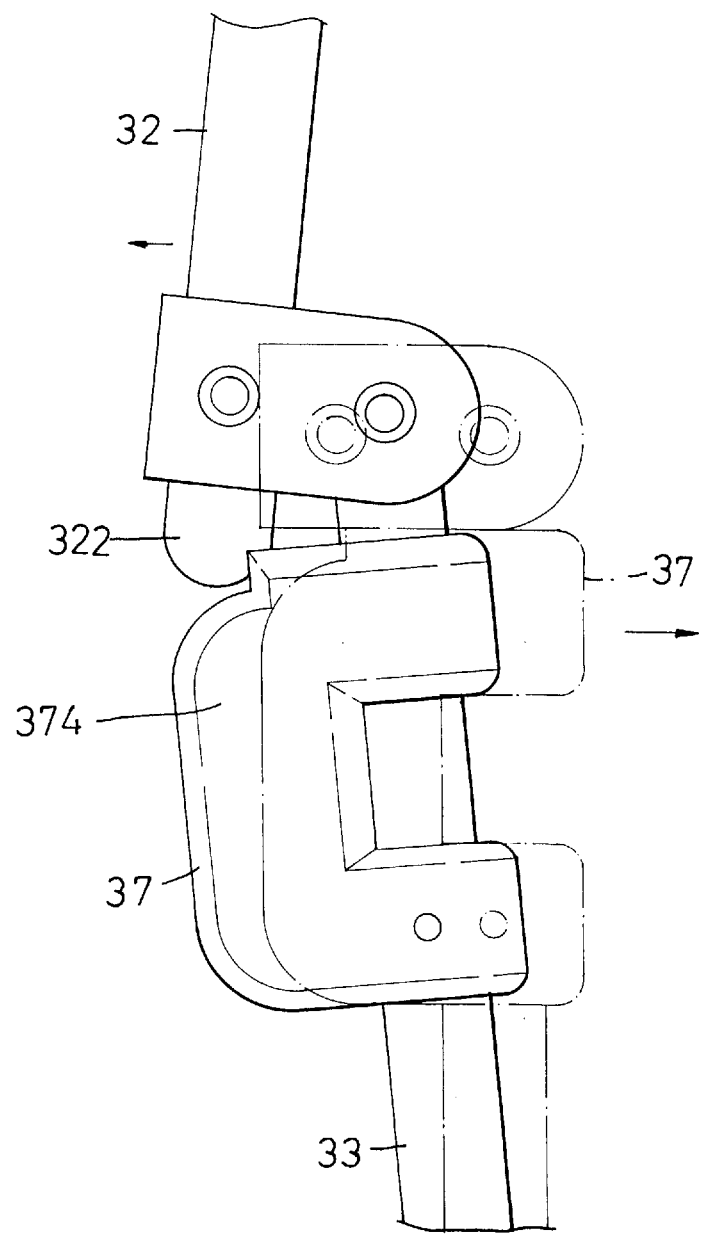
FIG. 10 illustrates how the lower rods are folded on the frame while the upper rods are folded onto the lower rods according to this invention.
Figure 11:
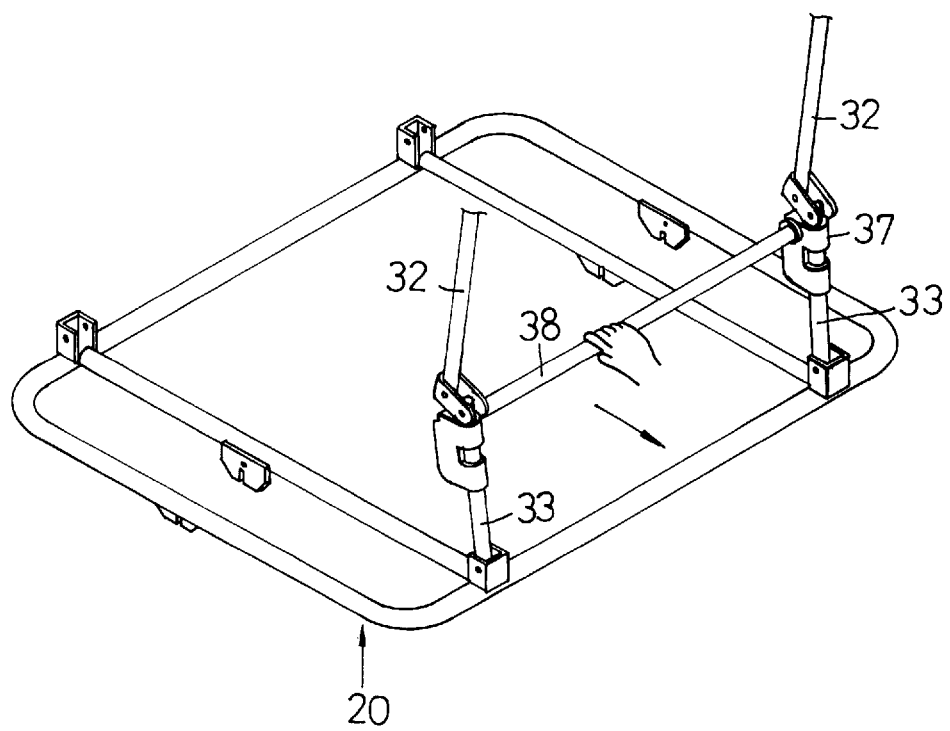
FIG. 11 illustrates how an uprightly erected sunshade support in the bicycle trailer of this invention is folded in a one-stroke operation.

As illustrated in FIGS. 9 to 11, the horizontal rod 38 can be depressed so as to move the bracing elements 37 toward the frame 20, thereby disengaging the lower ends 322 of the upper rods 32 from the accommodation holes 374 of the bracing elements 37. Immediately after the depressing action, the horizontal rod 38 is pushed forwardly toward the front end portion of the frame 20 to permit simultaneous folding action of the lower rods 33 onto the frame 20, the upper rods 32 onto the lower rods 33, and the curved rods 31 onto the upper rods 32.

Referring again to FIGS. 7 and 8, in order to prevent movement of the bracing element 37 relative to the lower rod 33, a retaining pin 379 can be inserted removably through the hole 372a in the bracing element 37 so as to extend into the engagement hole 335 in the lower rod 33. The retaining pin 379 is further provided with a retainer ring 380 that can be flapped onto the bracing element 37 so as to prevent unintentional removal of the pin 379 from the bracing element 37.

With this invention thus explained, it is apparent that numerous modifications and variations can be made without departing from the scope and spirit of this invention. It is therefore intended that this invention be limited only as indicated in the appended claims.

I claim:

1. A bicycle trailer adapted to be towed by a bicycle and including a rectangular carrier frame, two wheels provided on two side portions of the carrier frame, and a connecting device which is adapted to be coupled with a frame body of the bicycle, wherein the improvement comprises:

the carrier frame having a front end portion, a rear end portion, and two pairs of pivot seats, one pair of the pivot seats being respectively located on two sides of an upper surface of the front end portion, the other pair of the pivot seats being respectively located on two sides of an upper surface of the rear end portion;

a sunshade support mounted on said frame and including a pair of foldable units, each of which consists of a vertical lower rod, a vertical upper rod, and a curved rod, said curved rods having front ends connected pivotally to said pivot seats on said front end portion, said lower rods having bottom ends connected pivotally to said pivot seats on said rear end portion;

a pivot joint device including a pair of lower pivot joints and a pair of upper pivot joints, each of said upper pivot joints being pivoted to an upper end of a respective one of said upper rods and a rear end of a respective one of said curved rods at different positions, each of said lower pivot joints being pivoted to a respective one of said upper rods and a top end of a respective one of said lower rods at different positions; and a bracing device including a pair of spring-biased bracing elements, and a horizontal rod connected securely to said bracing elements so as to move together therewith relative to said lower rods, each of said bracing elements having an upwardly opening accommodation hole receiving fittingly a lower end of said upper rod so as to immobilize said upper rods relative to said lower rods, thereby permitting said upper and lower rods to be parallel to each other and correspondingly permitting said sunshade support to be supported stationarily on said frame such that a sunshade shield can be erected on said sunshade support;

whereby, when desired, said horizontal rod can be depressed so as to move said bracing elements toward said frame, thereby disengaging said lower ends of said upper rods from said accommodation holes of said bracing elements to permit simultaneous folding action of said lower rods onto said frame, said upper rods onto said lower rods, and said curved rods onto said upper rods upon pushing said horizontal rod forwardly toward said front end portion of said frame immediately after depression of said horizontal rod.

2. The trailer according to claim 1, wherein each of said lower rods has an engagement hole formed therein, each of said bracing elements including a spring-loaded tongue projecting horizontally therefrom to engage one of said engagement holes so that said bracing elements can move relative to said lower rods in order to disengage said upper rods from said accommodation holes of said bracing elements.

\* \* \* \* \*